S. TROOD.
MEASURING INSTRUMENT.
APPLICATION FILED OCT. 3, 1913.
1,185,734.
Patented June 6, 1916.
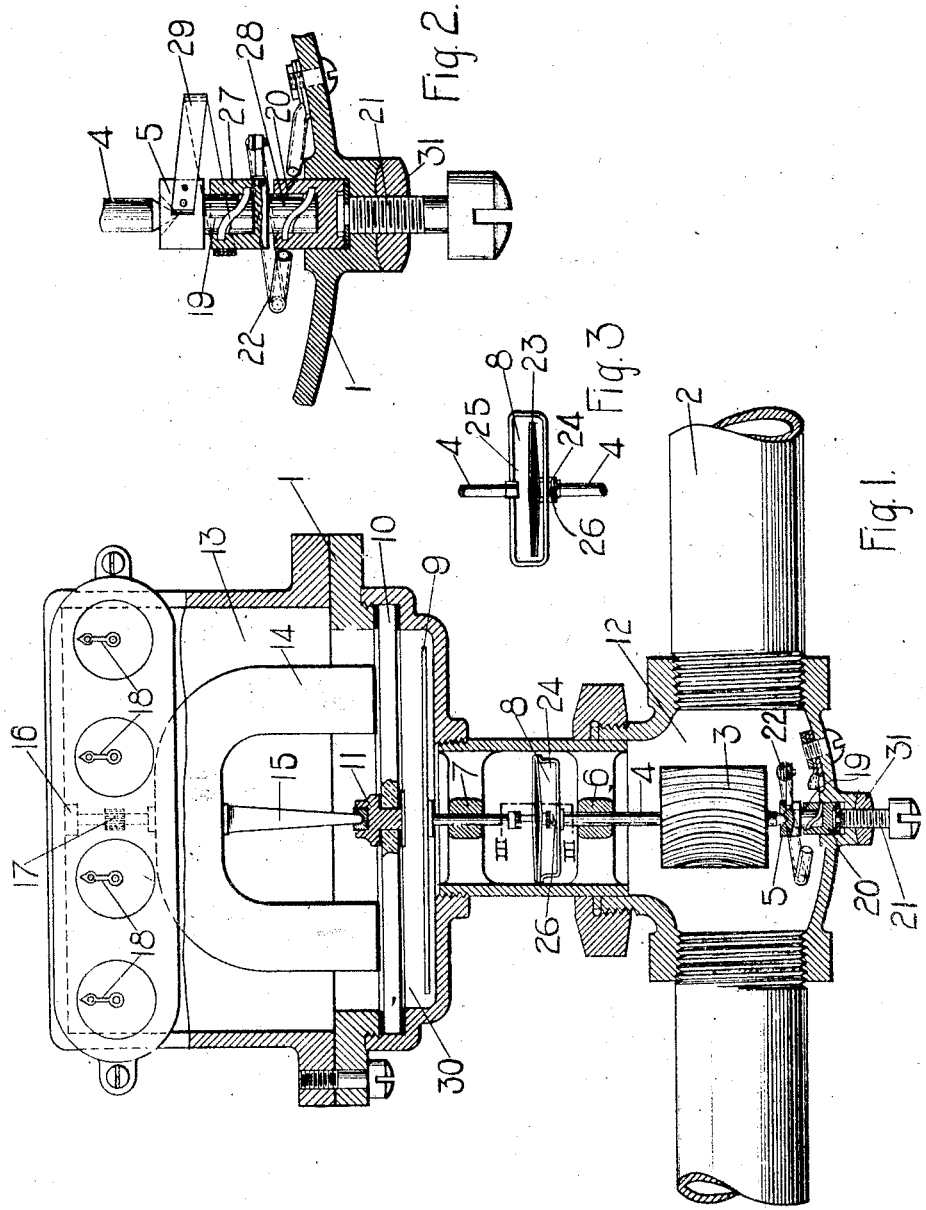
WITNESSES:
INVENTOR
Samuel Trood
BY
ATTORNEY

UNITED STATES PATENT OFFICE.

SAMUEL TROOD, OF WILKINSBURG, PENNSYLVANIA, ASSIGNOR TO WESTINGHOUSE ELECTRIC AND MANUFACTURING COMPANY, A CORPORATION OF PENNSYLVANIA.

MEASURING INSTRUMENT.

1,185,734.   Specification of Letters Patent.   Patented June 6, 1916.

Application filed October 3, 1913. Serial No. 793,117.

*To all whom it may concern:*

Be it known that I, SAMUEL TROOD, a citizen of the United States, and a resident of Wilkinsburg, in the county of Allegheny and State of Pennsylvania, have invented a new and useful Improvement in Measuring Instruments, of which the following is a specification.

My invention relates to measuring instruments and particularly to steam-flow meters, and it has for its object to provide a meter that is simple in construction and automatic in operation.

Numerous devices have been proposed for measuring the flow of steam, but substantially all of the proposed devices have some form of manually operated temperature and pressure corrective devices. Since the weight or quantity of steam flowing in a pipe is directly proportional to its velocity and pressure, and inversely proportional to its absolute temperature, in order to accurately measure the steam consumption, it is essential to measure simultaneously the pressure, velocity and temperature of the steam.

My present invention, which is constructed upon the above mentioned principle, is compact in construction and reliable in its operation and may be readily inserted directly in a steam line.

In the accompanying drawings, Figure 1 is a front view, partially in elevation and partially in section, of a steam-flow meter embodying my invention. Fig. 2 is a detail sectional view of a modified form of one of the corrective devices embodied in my invention and Fig. 3 is a section taken along the line III—III of Fig. 1.

A casing 1 is connected in a steam line 2 and supports a turbine wheel 3 that is carried by a shaft 4. The shaft 4 is supported by bearings 5, 6 and 7, hereinafter more fully described, and comprises two sections between which is interposed a thermostatic device 8 and to the upper section of which is attached a disk 9. A non-metallic diaphragm 10 that supports a bearing 11, divides the casing 1 into a steam compartment 12 and a compartment 13 for housing an integrating mechanism (not shown). A permanent magnet 14 is mounted on a shaft 15 that is journaled in the bearings 11 and 16 in the compartment 13. The shaft 15 is provided with a pinion 17 that engages the integrating mechanism to actuate a plurality of pointers 18 for the purpose of indicating the quantity of steam that has passed through the pipe 2.

The bearing 5 has its lower portion formed into one member 19 of a cam, the other member 20 of the cam being loosely mounted on the end of a screw 21. To the bearing 5 is attached one end of a Bourdon tube or pressure-actuated device 22, the other end being attached to the casing of the meter.

The thermostatic device 8 comprises, as shown in section in Fig. 3, an inclosed body 23 containing a substance having a high coefficient of expansion. To the periphery of the body 23 is attached the lower part of the shaft by supports 24, and to the lower side of the body 23 is attached a support 25 that connects the same to the upper section of the shaft 4. A spring 26 is also inserted between the lower part of the body 23 and the lower section of the shaft to support the weight of the disk 9.

Referring particularly to Fig. 2, instead of dividing the shaft 4 into two parts and inserting a thermostatic device 8, as shown in Fig. 1, the shaft may be one continuous piece of metal and a modified corrective arrangement supplied that comprises a bearing 5, the lower member 19 of which is formed into a cam member that engages a second cam member 27 having its lower portion 28 constituting a cam member to engage the cam member 20 that is held loosely by the screw 21. The cam member 20 may be moved longitudinally but not rotatively by the screw 21. To the bearing 5 is attached one end of a thermostat 29, the other end of which is attached to the cam member 27 that also carries one end of the Bourdon tube 22, the other end of which is attached to the casing 1 of the meter.

The Bourdon tube 22 is made of metallic tubing having the air exhausted therefrom and so disposed that, with increased pressure, it will tend to lessen its diameter by contracting. The thermostat 29 is formed of two dissimilar metals that tend to straighten out as the temperature rises, by reason of the difference in the coefficients of expansion of the two metals. The thermostatic device 8 is similar in its action to the thermostat 29, in that, when the temperature increases, the substance expands and the two plates of the body 23 are caused to diverge from one another, the bottom plate moving downwardly carrying the disk 9 with it to increase the length of the air gap 30.

Assume that the steam flowing through the pipe 2 has a definite velocity. This steam engages the blades of the turbine wheel 3 to rotate the same and the disk 9 at a speed that is proportional to the velocity of the steam. The permanent magnet 14 will be turned as the disk 9 rotates, because of the Foucault or eddy currents that are induced in the disk, and will effect movement of the pointers 18 in proportion to the quantity of the steam flowing. The length of the air gap 30 is controlled by the pressure and the temperature, or it may also be varied for the various sizes of the pipe 2 by adjusting the screw 21. When the pressure increases, the turbine wheel does not increase in speed, since its inherent speed is proportional to the velocity only, but the Bourdon tube 22 will tend to contract and thus cause the cam member 19 to ride around on the cam member 20 and raise the shaft an amount proportional to the increase in pressure. This decreases the length of the air gap 30 and causes increased Foucault currents to be induced in the disk 9, and, consequently, there is less slip between the permanent magnet 14 and the disk 9, and the magnet increases in speed.

When the temperature changes, the weight or quantity of the steam varies inversely as the temperature, but the speed of the turbine wheel is not altered, for reasons hereinbefore stated. However, with increased temperatures, the thermostatic device 8 lengthens the air gap 30, as hereinbefore explained, so that the slip between the permanent magnet 14 and the disk 9 is increased in proportion to the increased temperature. Hence, the permanent magnet 14 rotates in direct proportion to the velocity and pressure and in inverse proportion to the temperature of the steam. Changes in the length of the air gap 30 to adapt the instrument to various sizes of pipe 2, may be accomplished by turning the screw 21 that may be locked in any predetermined position by a lock nut 31, substantially as hereinbefore explained.

In the modification shown in Fig. 2, when the pressure of the steam increases, the Bourdon tube 22 contracts along its diameter causing the cam member 28 to ride over the face of the cam member 20 to thus raise the cam member 27, the cam member 19 and the bearing 5 as a unit, because they are tied together by the thermostat 29. Hence, as the bearing 5 is raised, the shaft 4 and the disk 9 are raised, and the length of the air gap 30 is decreased in proportion to the rise in pressure, as hereinbefore described. If the temperature decreases, the diameter of the thermostat 29 will tend to decrease, by reason of the unequal contraction of its members, causing the cam member 19 to ride around the face of the cam member 27 which is held in a relatively fixed position by the Bourdon tube 22, to thus raise the bearing 5, the shaft 4 and the disk 9, and, at the same time, to decrease the length of the air gap 30.

My invention is not limited to the particular constructions illustrated, but may be variously modified within the scope of the appended claims.

I claim as my invention:

1. A fluid meter comprising a rotatable armature, a rotatable permanent magnet, means for rotating the said armature in accordance with the velocity of the fluid to be measured, and means for varying the air gap between the rotatable armature and the said permanent magnet in accordance with the pressure of the fluid to be measured.

2. A fluid meter comprising a rotatable armature, a rotatable permanent magnet, means for rotating the said armature in accordance with the velocity of the fluid to be measured, and a Bourdon tube for varying the air gap between the rotatable armature and the permanent magnet in accordance with the pressure of the fluid to be measured.

3. A steam-flow meter comprising a rotatable armature, a rotatable permanent magnet, means for rotating the said armature in accordance with the velocity of the steam to be measured, bearings for the said armature having cam faces thereon, and means for rotating the said cam faces to vary the air gap between the armature and the permanent magnet in accordance with the pressure of the steam to be measured.

4. A steam-flow meter comprising a rotatable armature, a rotatable permanent magnet, means for rotating the said armature in accordance with the velocity of the steam to be measured, bearings for the said armature having cam faces thereon, and means for rotating the said cam faces to vary the air gap between the armature and the permanent magnet in accordance with the pressure and temperature of the steam to be measured.

5. A fluid meter comprising a turbine wheel mounted on a shaft, a bearing for the shaft, means controlled by the pressure of the fluid for varying the position of the said bearing longitudinally, and integrating mechanism and electromagnetic means controlled by the position of the said shaft for actuating the said integrating mechanism.

6. A fluid meter comprising a turbine wheel mounted on a shaft, a bearing for the shaft, a Bourdon tube and a thermostatic device for varying the position of the bearing longitudinally in accordance with the pressure and temperature of the fluid, an indicating mechanism, and means depending upon the position of the said shaft for actuating the indicating mechanism.

7. A fluid meter comprising a turbine wheel mounted on a shaft, a bearing for the shaft having cam faces thereon, a thermostatic device for varying the position of the bearing and the shaft longitudinally in accordance with the temperature of the fluid, an indicating mechanism, and means depending upon the position of the said shaft for actuating the indicating mechanism.

8. A steam-flow meter comprising a housing having two non-communicating compartments therein, a rotatable member in one of the said compartments, means for rotating the said rotatable member in proportion to the velocity of the steam the flow of which is to be measured, a disk mounted on the said rotatable member, means for changing the position of the said disk in proportion to a change in temperature of the steam, means for changing the relative position of the said disk in proportion to a change in the pressure of the steam, and a rotatable member in the other of the said compartments that is actuated by the said disk with a velocity that is proportional to the quantity of the steam.

9. A steam-flow meter comprising a housing having two non-communicating compartments, a rotatable member in one of the said compartments, means for rotating the said rotatable member in proportion to the velocity of the steam the flow of which is to be measured, a disk on the said rotatable member, means for changing the position of the said disk in accordance with the change in temperature of the steam, a Bourdon tube operatively connected to the said rotatable member, and a second rotatable member in the other of the said compartments, said second rotatable member actuated by the said disk to have a velocity that is proportional to the quantity of steam.

10. A fluid meter comprising a turbine wheel mounted on a shaft and being adapted to rotate in accordance with the velocity of the fluid, a bearing for the shaft having cam faces thereon, a Bourdon tube and a thermostatic device for varying the position of the bearing and the shaft longitudinally in accordance with the pressure and temperature of the fluid, an indicating mechanism, and an electromagnetic device that is dependent upon the position of the shaft for actuating the said indicating mechanism.

11. In a steam line, the combination with a steam-flow meter comprising a turbine wheel and a shaft therefor, of a bearing for the said shaft, means for altering the relative position of the said bearing to change the position of the shaft in accordance with the pressure of the steam in the said steam line, means for changing the relative position of the said shaft for variations in the size of the said steam line, an integrating mechanism, and means actuated by the said shaft and dependent upon the relative position of the said shaft for operating the said integrating mechanism.

12. A fluid meter comprising a housing having two non-communicating compartments therein, a rotatable member in one of the said compartments, a turbine wheel in the other compartment adapted to rotate in accordance with the velocity of the fluid, a disk actuated by the said turbine wheel, and means for changing the position of the said disk in accordance with temperature and pressure of the fluid to actuate the said rotatable member.

In testimony whereof, I have hereunto subscribed my name this 22nd day of Sept. 1913.

SAMUEL TROOD.

Witnesses:
  B. B. HINES,
  M. C. MERZ.